US012385282B2

(12) United States Patent
Awad

(10) Patent No.: US 12,385,282 B2
(45) Date of Patent: Aug. 12, 2025

(54) DEVICE TO ASSIST IN CLOSING DOORS, AND BIASING MECHANISM FOR SAME

(71) Applicant: Tony Awad, Ottawa (CA)

(72) Inventor: Tony Awad, Ottawa (CA)

(73) Assignee: Tony Awad, Ottawa (CA)

( * ) Notice: Subject to any disclaimer, the term of this patent is extended or adjusted under 35 U.S.C. 154(b) by 25 days.

(21) Appl. No.: 18/243,157

(22) Filed: Sep. 7, 2023

(65) Prior Publication Data

US 2025/0084665 A1 Mar. 13, 2025

(51) Int. Cl.
*E05B 1/00* (2006.01)

(52) U.S. Cl.
CPC .......... *E05B 1/0015* (2013.01); *E05B 1/0053* (2013.01); *E05B 2001/0023* (2013.01)

(58) Field of Classification Search
CPC ................. E05B 1/0015; E05B 1/0053; E05B 2001/0023
See application file for complete search history.

(56) References Cited

U.S. PATENT DOCUMENTS

| | | | | | |
|---|---|---|---|---|---|
| 121,168 | A | | 11/1871 | Hannan | |
| 822,708 | A | * | 6/1906 | Wright | H03M 1/00 403/152 |
| 1,143,360 | A | * | 6/1915 | Chorvath | E05B 1/0015 16/413 |
| 1,227,929 | A | * | 5/1917 | Ralston | A61G 17/041 16/439 |
| 2,088,476 | A | | 7/1937 | Kemper | |
| 2,472,989 | A | * | 6/1949 | Skipper | B62B 1/002 280/47.27 |
| 2,599,054 | A | | 6/1952 | Gates et al. | |
| 3,480,990 | A | | 12/1969 | Bouwma | |
| 3,782,765 | A | * | 1/1974 | Wallyn | E05C 19/10 292/204 |
| 3,889,992 | A | * | 6/1975 | Shelton | E05B 65/0014 292/87 |
| 4,170,803 | A | * | 10/1979 | Saito | A47L 11/32 15/144.1 |
| 4,686,742 | A | | 8/1987 | Arnold | |
| 4,817,239 | A | | 4/1989 | Campbell et al. | |
| 4,926,965 | A | | 5/1990 | Fox | |
| 5,042,676 | A | | 8/1991 | Gohlke | |

(Continued)

FOREIGN PATENT DOCUMENTS

| | | | |
|---|---|---|---|
| GB | 2478366 | A | 9/2011 |
| JP | 2002177077 | A | 6/2002 |

*Primary Examiner* — Jason W San
*Assistant Examiner* — Matthew J Sullivan
(74) *Attorney, Agent, or Firm* — Moffat & Co

(57) ABSTRACT

There is provided a device to facilitate closing doors for people who use wheelchairs or have other mobility challenges. The device can be secured to an internal or external door surface using conventional means, at a height similar to the height of a typical door handle, but closer to the hinges than a typical door handle. The device comprises a base portion for securing the device to the door surface, an arm extending from the base portion, and a handle at the distal end of the arm. During operation, the device allows a person in a wheelchair to close the door by grabbing the handle of the device without positioning the wheelchair within the door frame. There is also provided a biasing device to return the arm to a biased position.

17 Claims, 9 Drawing Sheets

(56) References Cited

U.S. PATENT DOCUMENTS 5,231,731 A 8/1993 Jones, Jr.
5,269,044 A * 12/1993 Marion .................... B63B 27/14 114/362
5,277,449 A * 1/1994 Schmidt .................. B62B 1/266 280/655
5,394,965 A * 3/1995 Kho ..................... A45C 13/262 280/37
5,464,080 A * 11/1995 Liang ................... A45C 13/262 280/37
5,540,468 A 7/1996 Fassman
5,547,053 A * 8/1996 Liang ................... A45C 13/262 16/113.1
5,553,355 A 9/1996 Baty
5,625,921 A * 5/1997 Smith ...................... B60N 3/02 16/445
5,855,408 A 1/1999 Rickabus
5,975,606 A 11/1999 Forbes et al.
6,048,125 A 4/2000 Droche et al.
6,076,233 A 6/2000 Sasaki et al.
6,289,557 B1 9/2001 Manson et al.
6,643,897 B2 11/2003 Chang
6,651,791 B1 * 11/2003 Nykoluk .............. A45C 13/262 190/115
6,751,827 B1 6/2004 Fok
7,373,693 B2 * 5/2008 Markl ................. E05D 11/0054 16/334
7,624,966 B2 12/2009 Dando et al.
7,938,464 B1 5/2011 Hielm
8,353,546 B1 1/2013 Cacas
8,522,482 B2 9/2013 Buck
8,910,819 B2 * 12/2014 Seiders ................... E05B 65/52 220/592.2
10,837,197 B2 * 11/2020 Kightlinger ............. E05B 5/003
11,053,724 B2 * 7/2021 Awad ........................ E05F 9/00
12,071,786 B2 * 8/2024 Crondahl .................. F16F 9/19
2002/0184736 A1 * 12/2002 Nelson ...................... E05F 9/00 16/412
2010/0320779 A1 12/2010 Yoo
2013/0326845 A1 12/2013 Hinkle
2014/0007381 A1 * 1/2014 Huang ................... A47B 95/02 16/421
2019/0336297 A1 * 11/2019 Reeder .................. A61F 2/3859
2019/0390476 A1 12/2019 Kightlinger
2021/0071452 A1 * 3/2021 Tomao ...................... E05C 5/04

* cited by examiner

DEVICE TO ASSIST IN CLOSING DOORS, AND BIASING MECHANISM FOR SAME

FIELD OF THE DISCLOSURE

The present disclosure relates to a biasing mechanism, for use in, amongst others, a device to assist individuals with disabilities with opening and closing doors.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

Simple tasks such as opening or closing a door can become complicated for people with disabilities. For example, a person who is confined to a wheelchair or who uses a walker may find it difficult to close the door behind them as they leave a room, especially if the door opens towards the inside of the room. Other examples: if the door has a high threshold where the wheelchair cannot easily roll over, or if there is a step or ramp at the door making reaching for the conventional door knob more difficult, especially for people with limited balance, strength, or mobility. Therefore, there is a need for a device which assists people with disabilities in closing the door.

There further exists a need for a biasing mechanism which will ensure a rigid element such as a door, lid, or handle is biased in a desired direction.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The present disclosure is directed to a device comprising a base having a flat surface and a bottom portion; an arm extending from the base, the arm comprises a proximal end and a distal end, with the arm being secured to the base via a pivoting axis allowing the arm to pivot with respect to the base; a handle at the distal end of the arm; the arm including a cavity therein at the proximal end of the arm; and biasing means configured to bias the arm in a direction towards a first position where the arm is substantially parallel to the base, wherein the biasing means includes: a spring within the cavity of the arm; a concave ramp extending upwardly from the bottom portion, the concave ramp having a first end substantially perpendicular to the flat surface and a second end substantially parallel with the flat surface; and a rigid member positioned against the spring and extending out from the cavity to engage with the concave ramp; wherein the radial distance from the pivoting axis to the second end of the concave ramp is greater than the radial distance from the pivoting axis to any other point of the concave ramp, thus allowing the rigid member to extend the furthest out of the arm cavity when the arm is substantially parallel to the base.

In one embodiment, the pivoting axis is defined by two pins extending outwardly from opposing sides of the arm. Preferably, the bottom surface may also include two pin supports which extend upwardly from the bottom surface to engage the two pins.

In a preferred embodiment the base comprises two shoulders extending upwardly from the flat surface, and wherein the proximal end of the arm is positioned in a cavity defined by the two shoulders. Preferably, each of the two shoulders may also include a channel for housing one of the pin supports and one of the pins.

In one embodiment the device may include a stop member configured to restrict the pivoting of the arm towards the base such that when the arm rests against the stop member the arm is in the first position. This stop member may be located on the arm.

The present disclosure is further directed to a biasing mechanism, comprising a base having a flat surface and a bottom portion; an element extending in a longitudinal direction from the base, the element comprising a proximal end and a distal end, with the element being secured to the base via a pivoting axis allowing the element to pivot with respect to the base; the element including a cavity therein at the proximal end of the element; and biasing means configured to bias the element towards a biased position, wherein the biasing means includes: a spring within the cavity of the element; a concave ramp extending upwardly from the bottom portion, the concave ramp having a first end substantially perpendicular to the flat surface and a second end substantially parallel with the flat surface; and a rigid member positioned against the spring and extending out from the cavity to engage with the concave ramp; wherein the radial distance from the pivoting axis to the concave ramp is greatest when the element is in the biased position, thus allowing the rigid member to extend the furthest out of the cavity when the element is in the biased position.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The present disclosure will be better understood having regard to the drawings in which.

DETAILED DESCRIPTION OF THE DRAWINGS

Figure 1:
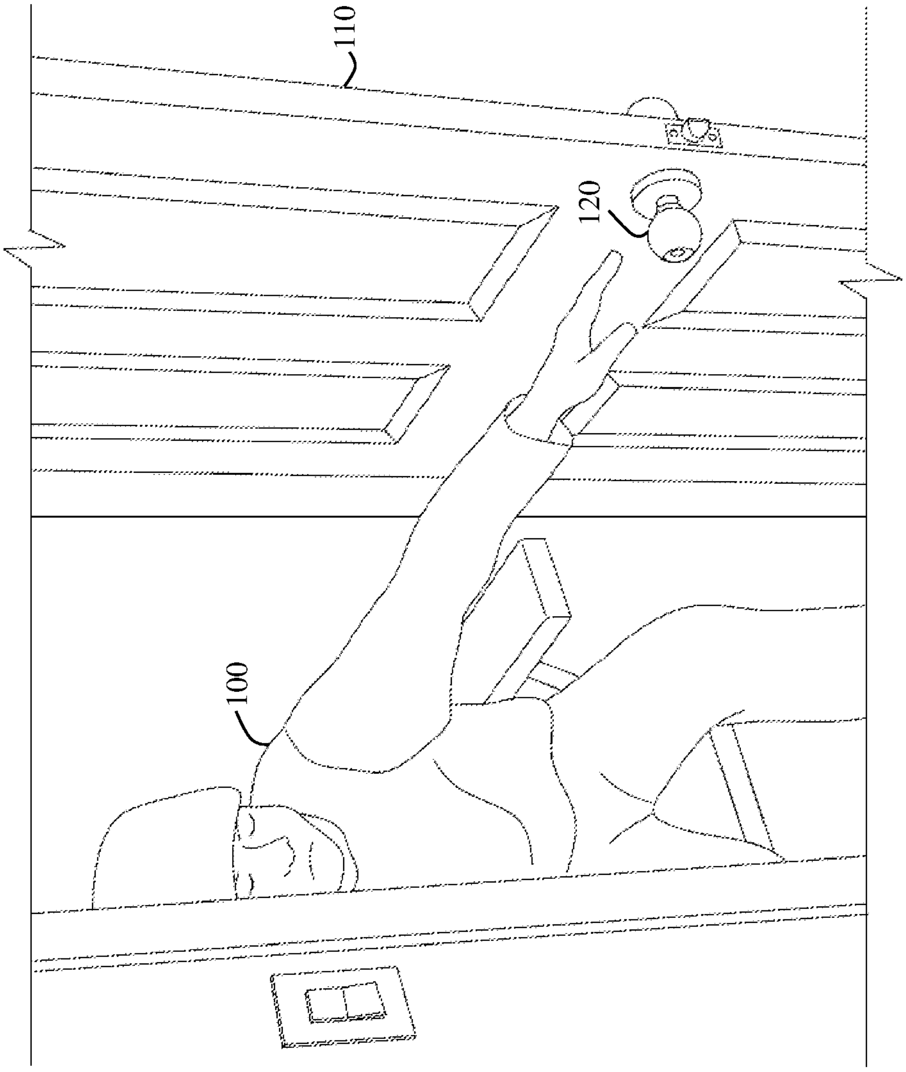
FIG. 1 shows a perspective view of a person in a wheelchair closing a door according to the prior art.

When a person who is in a wheelchair exits a room, it is difficult for them to close the door when the door opens inward. For example, as illustrated in FIG. 1, a person in a wheelchair 100 is exiting a room, and is attempting to close the door 110 behind them. However, the door knob is situated at the farthest possible point on the door, and reaching the door knob 120 can be very difficult, and may even require the person in the wheelchair 100 to position the wheelchair within the room to reach the door knob 120. As the door 110 closes, the person in the wheelchair 100 needs to simultaneously back up through the door frame, while reaching forward to reach door knob 120.

The situation described above occurs a very large number of times in the day to day life of a person in a wheelchair. In some scenarios, the person in the wheelchair may even fall, risking injury or a major inconvenience.

Accordingly, there is a need for an improved method of closing and opening doors for people in wheelchairs.

Figure 2:
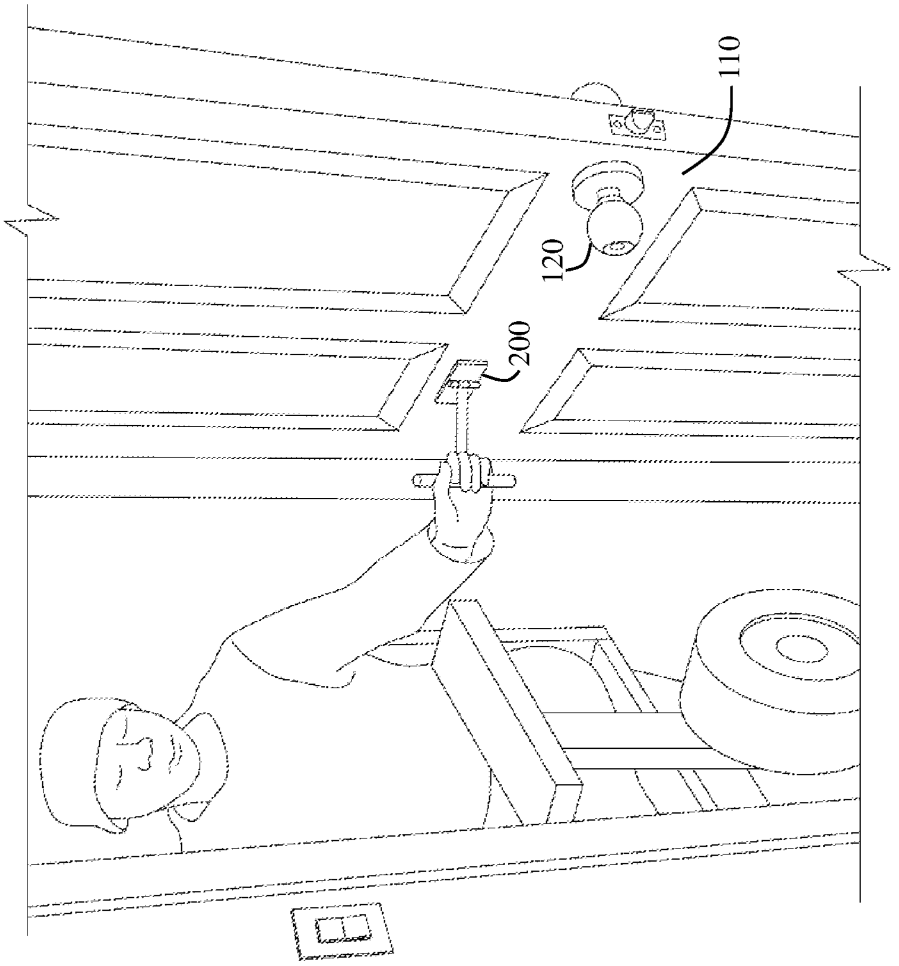
FIG. 2 shows a perspective view of a person in a wheelchair closing a door using a device according to the present disclosure.

Reference is now made to FIG. 2, which illustrates the operation of a device 200 according to one embodiment of the invention. As can be seen in FIG. 2, the device 200 is installed on an external surface of the door 110. Typically, the device 200 is installed at a height comparable to the height where door knob 120 is usually found. However, the device 200 may be installed at any height which is most convenient for the user. As described below, the device 200 may be installed on the door using various means, some possibilities of which are described herein.

Figure 4:
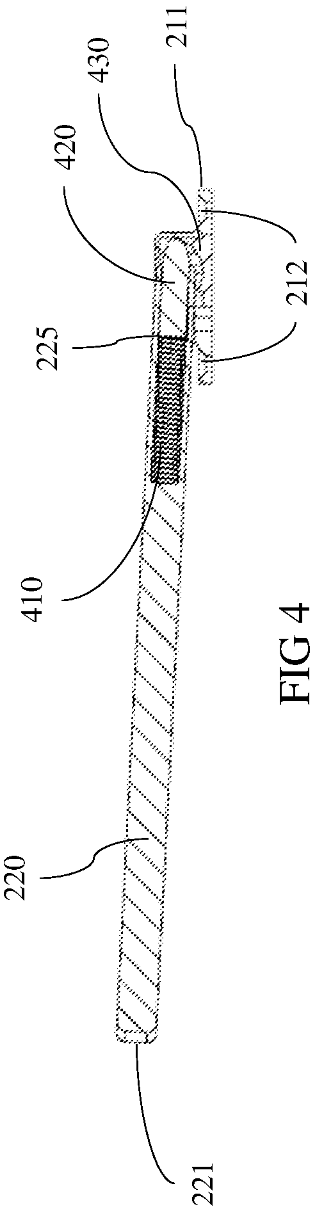
FIG. 4 shows a cross-section view of the device of FIG. 3, taken along line 4-4.
Figure 3:
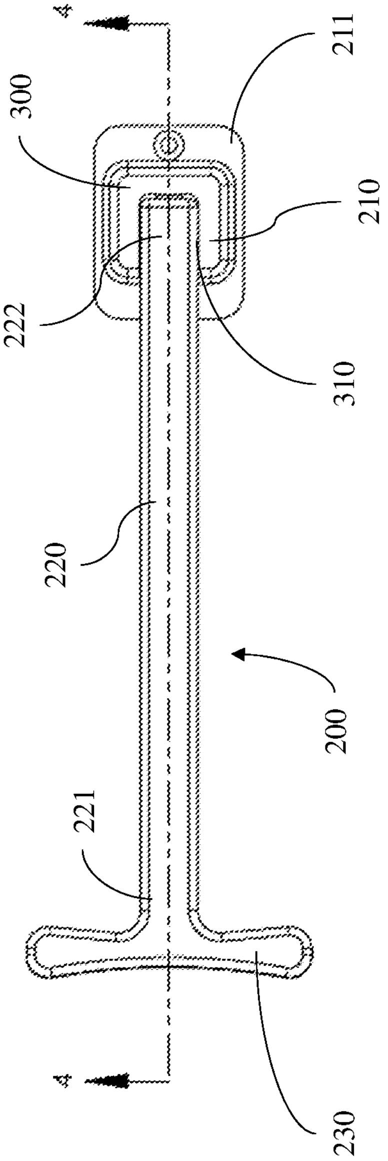
FIG. 3 shows a top view of a device according to at least one embodiment of the present disclosure.

As seen in FIGS. 3 and 4, according to at least one embodiment, a base 210 comprises a flat surface 211 having disposed thereon an adhesive substance. Alternatively, the flat surface 211 may be free of any adhesive substance, and an adhesive substance may be applied to surface 211 at the time of installation.

According to at least another embodiment, device 200 further comprises a separate anchor portion (not shown) comprising means for securing the anchor portion to a door surface. The means for securing the anchor portion to the door surface may include, but are not limited to, holes adapted to receive screws or nails, an adhesive substance, and other securing means known in the art. The anchor portion further comprises means for securing the base 210 of the device 200. For example, the anchor portion may comprise grooves on its internal sides' surfaces designed to cooperate with tongues extending from the side surfaces of the base 210 to secure the base 210 with the anchor portion. However, other means of securing the anchor portion with the base 210 are within the scope of the present disclosure and the present disclosure is not so limited.

Furthermore, device 200 is typically installed nearer to the door hinges than the door handle, as is shown in FIG. 2. This allows a person in a wheelchair to grab the device 200 from a position which is outside the door being closed, thereby making it easier for the person in the wheelchair to close the door. In particular, unlike the situation illustrated in FIG. 1, the person in the wheelchair does not need to be within the room to initially reach the door handle, which means that the person does not need to back up as the door is being closed.

Once the door 110 is closed, the user may release the device 200, and biasing mechanism 400 will return the device 200 to a first position, where the arm 220 is in a position substantially horizontal to the door 110. The operation of the biasing mechanism 400 will be explained further below.

While the example illustrated in FIG. 2 shows that the device is installed on an external door surface, the device can also be installed on an internal door surface, especially for doors which swing outwards.

Reference is now made to FIGS. 3-11, which illustrates a device according to a first embodiment of the present disclosure. The device 200 comprises a base 210, an arm 220, and a handle 230. According to at least one embodiment, the base 210 comprises a flat surface 211 and a bottom portion 215. The flat surface 211 is for facilitating attachment to a door surface and the bottom portion 215 is for facilitating the biasing mechanism 400, both of which will be described in greater detail below. The base 210 may also comprise holes 212 for allowing screws or other means of securing the device to a door surface. The biasing mechanism 400, for returning the device 200 to a first, biased position, is also included in a preferred embodiment.

In the first position, as seen in FIGS. 3 and 4, the arm 220 extends in a direction which is substantially parallel to the plane in which surface 211 resides. As will be appreciated, this plane corresponds substantially to the door surface when the device 200 is installed on a door. According to at least some embodiments, the arm 220 is separated from that plane by a sufficient distance to allow a person with a closed fist to easily grip or use the arm 220 when device 200 is installed on a door.

Figure 5:
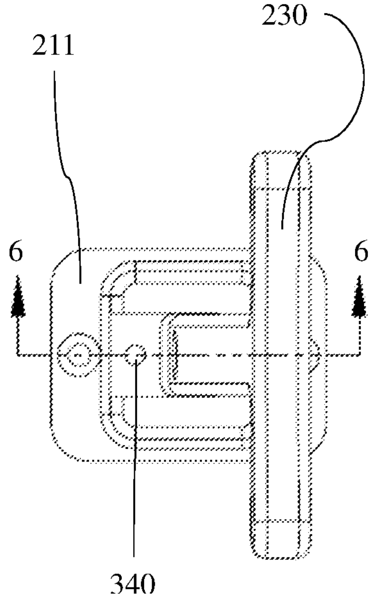
FIG. 5 shows a top view of the device of FIG. 3, with the arm in an extended position.
Figure 6:
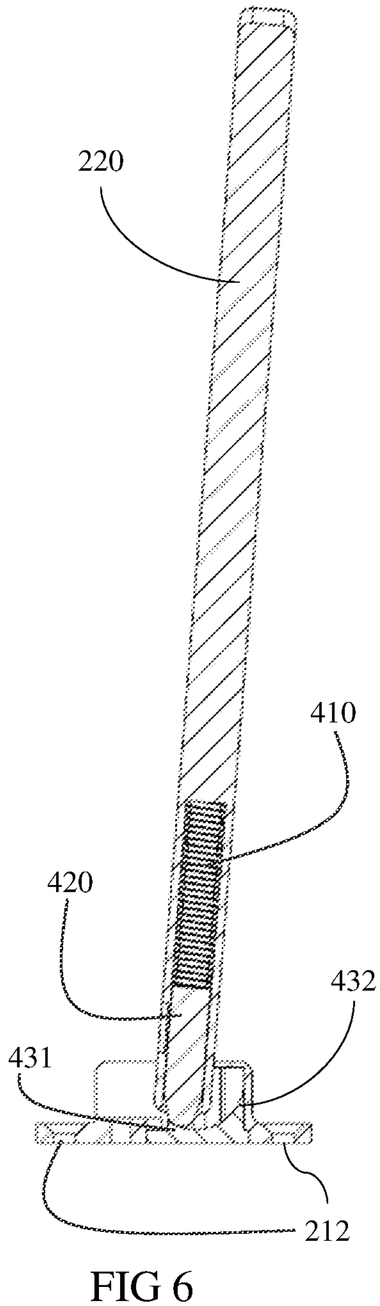
FIG. 6 shows a cross-section view of the device of FIG. 5, taken along line 6-6.

In a second position, as seen in FIGS. 5 and 6, after pivoting relative to the base 210 around a pivoting axis, arm 220 may extend in a direction away from surface 211, such that when the device 200 is installed on a door, the distal end 221 of arm 220 is further away from the door surface than proximal end 222.

Device 200 further comprises a handle 230 located at distal end 221 of arm 220. The handle may form a T-shape as shown in FIG. 3, but other handle shapes are within the scope of the present disclosure. In at least one embodiment, the handle consists simply of the distal end of arm 220. Handle 230 allows the user to easily grab the device and close the door.

Figure 8:
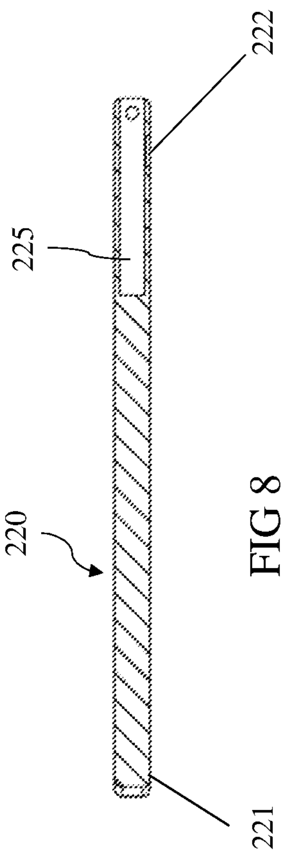
FIG. 8 shows a cross-section view of the device of FIG. 7, taken along line 8-8.
Figure 7:
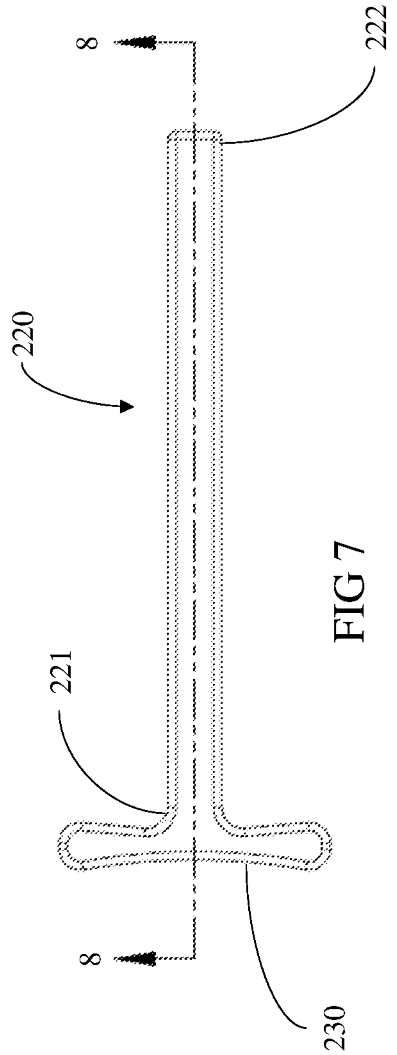
FIG. 7 shows a top view of the arm section according to at least one embodiment of the present disclosure.

Furthermore, and as can be seen in cross-sectional views of FIGS. 4, 6 and 8, the arm 220 includes a channel 225 at the proximal end 222.

Also located at the proximal end 222 of the arm 220 is a pivoting axis, for pivoting arm 220 with respect to the base 210. In a preferred embodiment, the base 210 further comprises a pivoting arrangement 300 for securing arm 220 to the base and for allowing arm 220 to pivot with respect to the base 210. The pivoting arrangement 300 comprises a cavity 310 for receiving the proximal end of arm 220. On each side of cavity 310 are shoulders 315*a* and 315*b*, the edges of which define cavity 310.

In this preferred embodiment, within each shoulder 315*a* and 315*b* are channels 316*a* and 316*b*, which house pins 317*a* and 317*b*. These pins 317*a* and 317*b* each extend outwardly from opposing sides of arm 220 at its proximal end 222. Thus, with pins 317*a* and 317*b* being housed within channels 316*a* and 316*b*, the arm 220 is secured to base 210 at this pivoting axis. It should be understood that the channels 316*a* and 316*b* and pins 317*a* and 317*b* are dimensioned so that the pins fit snugly within the channels, but are still able to pivot around the pivoting axis.

Figure 9:
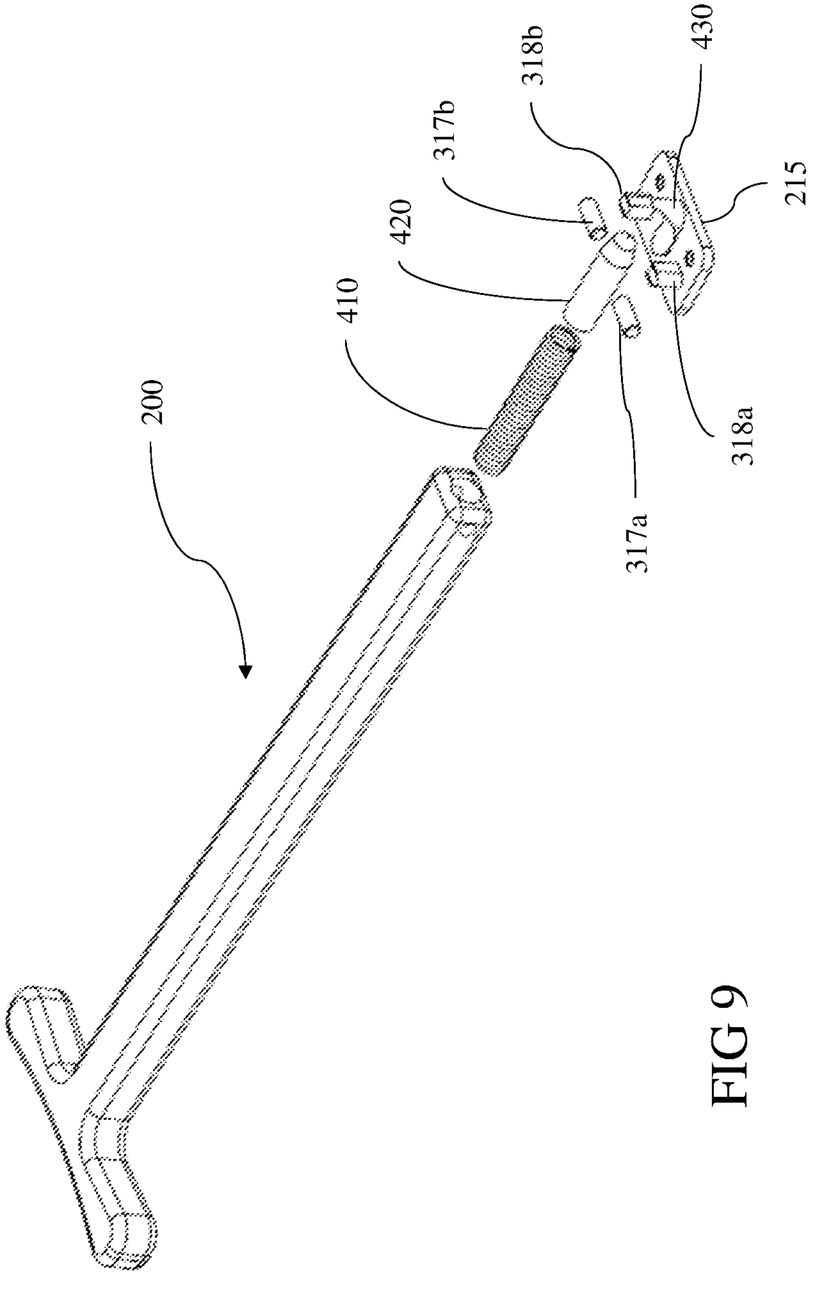
FIG. 9 shows an exploded view of the arm portion and the biasing mechanism of the device according to at least one embodiment of the present disclosure.
Figure 10:
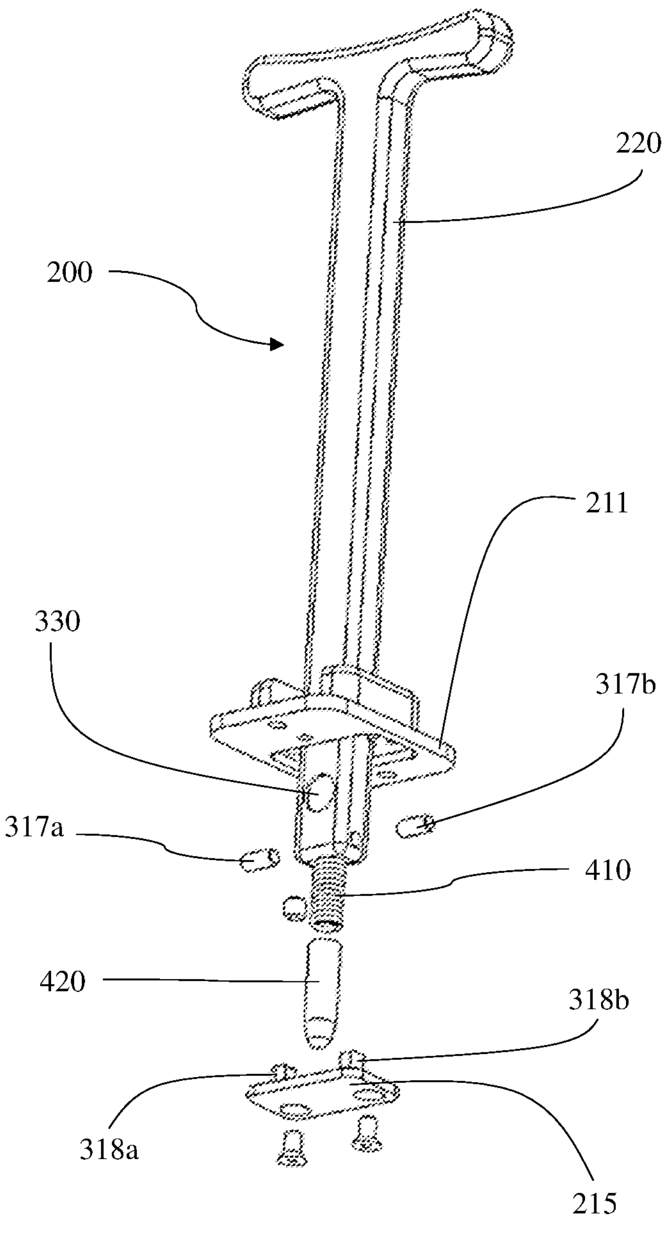
FIG. 10 shows an exploded view of a device according to at least one embodiment of the present disclosure.

In a preferred embodiment, and as can be seen in the exploded views in FIGS. 9 and 10, the base 210 includes a bottom portion 215 which mates to the bottom of flat surface 211. Extending upwards from bottom portion 215 are pin supports 318*a* and 318*b*. When bottom portion 215 is mated to flat surface 211, pin supports 318*a* and 318*b* extend upwardly into channels 316*a* and 316*b*, shown in FIG. 11B, and support pins 317*a* and 317*b*.

As mentioned above, a preferred embodiment of the invention includes a biasing mechanism 400 which pivots the arm 220 around the pivoting axis, to bias the arm 220 back to a first position substantially parallel to the flat surface 211 of the base 210.

Thus, a user can grasp the device 200 by the handle 230 to close a door, and when the handle 230 is released, the biasing mechanism 400 will pivot the arm back to the first position. This prevents arm 220 from being left extended outwardly from the door, where it could potentially cause injury or damage.

As seen in FIGS. 9-14, biasing mechanism 400 includes a spring 410, which is located within the arm cavity 225, and a rigid member 420, which is positioned against the spring 410. The biasing mechanism 400 further includes a concave ramp 430, the concave ramp 430 extending upwardly from the bottom portion 215. In this preferred embodiment the rigid member 420 extends from the arm cavity 225 and engages with the concave ramp 430. Thus, as the arm 220 pivots around the pivoting axis the proximate end of rigid member 420 travels along the concave ramp from a first end 431 to a second end 432.

Figure 14A:
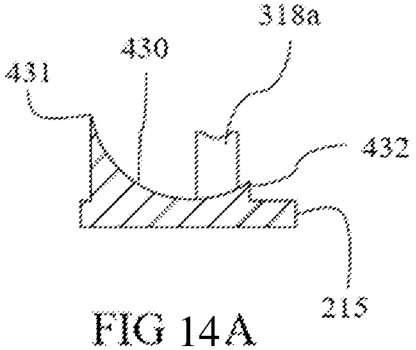
FIG. 14A shows a cross-section view of one embodiment of the bottom portion of FIG. 13, taken along line 14-14.
Figure 13:
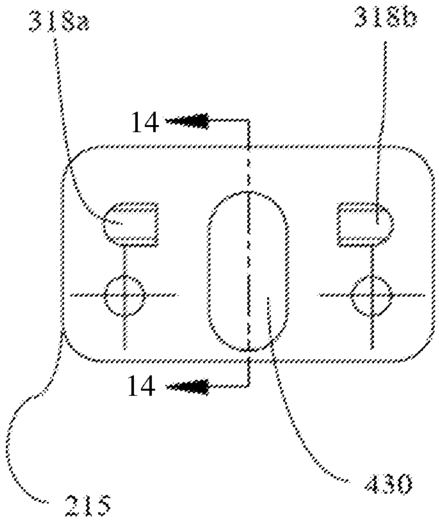
FIG. 13 shows a top view of the bottom portion according to at least one embodiment of the present disclosure.
Figure 14B:
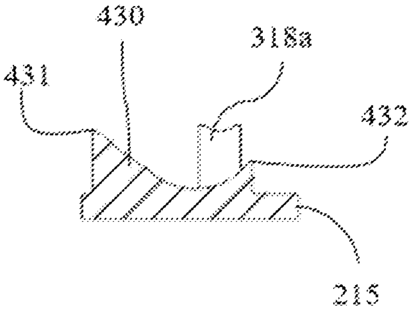
FIG. 14B shows a cross-section view of an alternate embodiment of the bottom portion of FIG. 13, taken along line 14-14.

Reference is now made to FIGS. 14A and 14B, where it can be seen in these embodiments that the concave ramp 430 does not have a circular profile. Thus, the radial distance from the pivoting axis created by pins 317*a* and 317*b* to the first end 431 of the concave ramp differs from the radial distance to the second end 432 of the concave ramp.

As can be seen in FIGS. 14A and 14B, the concave ramp 430 can have varying cross-sectional profiles. In both of these examples it is understood that the pivoting axis is located where the pins 317*a* and 317*b* (not shown in FIGS. 14A and 14B) would sit on top of the pin supports 318*a* and 318*b*. It can also be seen that the radial distance from the pivoting axis to the concave ramp 430 varies, depending on the position along the concave ramp.

It should be understood that alternate designs of the concave ramp 430 would be within the scope of the invention. This includes the positioning of the second end 432 of the concave ramp. As seen in the cross-section FIGS. 14A and 14B, the second end 432 can be raised upwardly from the bottom portion 215 at differing heights. It is within the scope of the invention for the second end 432 to be approximately the same height from the bottom surface 215 as the first end 431, creating a profile similar to a U-shaped "half pipe". Also within the scope of the invention is an embodiment where the second end 432 is flush with bottom portion 215.

In a preferred embodiment, when the rigid member 420 is engaged at the first end 431 of the concave ramp the arm 220 is in the first position, substantially parallel to the flat surface 211. In this embodiment the radial distance from the pivoting axis to the first end 431 would be greater than the radial distance from the pivoting axis to any other point along the concave ramp.

In this arrangement, the compressive strength of the spring 410 will attempt to push the rigid member 420 out of the cavity 310 as far as possible, which would occur at the location along the concave ramp where the radial distance is the greatest.

In operation, when arm 220 is extended away from the door (as seen in FIGS. 5 and 6), the rigid member 420 travels along the length of the concave ramp 430 towards its second end 432. In doing so, rigid member 420 is pushed further inside cavity 310, thus increasing tension within spring 410. When the arm 220 is released, the tension within spring 410 pushes rigid member 420 as far out of cavity 310 as it can, thus bringing the arm 220 back to a position which is parallel, or nearly parallel, to the surface of the door on which it is used.

In an alternate embodiment, where it is desired to bias the arm 220 in a biased position substantially perpendicular to the flat surface 211, the height of the pin supports 318*a* and 318*b* and the profile of the concave ramp 430 would be configured such that the greatest radial distance from the pivoting axis to the concave ramp 430 would occur at the second end 432 of the concave ramp.

In this manner, it should be understood that alternate biased positions can be achieved by configuring the heights of the pin supports 318*a* and 318*b* and the profile of the concave ramp 430 in other arrangements such that the greatest radial distance between the pivoting axis and the concave ramp 430 occurs when the arm 220 is in the desired biased position.

Reference is now made to yet another embodiment of the present disclosure, where the range of motion of the arm is restricted to improve user experience.

Specifically, some people who require the use of a wheelchair have other conditions which may limit their dexterity. In particular, a condition known as "claw hand" may be caused by muscular dystrophy, or other underlying causes, which severely limits the amount of movement in the hands of people who are affected.

For people suffering from claw hand, or other similar conditions, and who also use a wheelchair, it may be difficult to grab the handle of a device of the present disclosure if the handle is resting on the door surface. Specifically, the handle may pivot to a position where the handle is touching the door surface. From this position, it may be difficult for some people to engage with the handle and close the door properly.

The optional embodiment provided prevents this situation by limiting the range of motion of the arm, by providing a stop member 330.

According to at least one embodiment, stop member 330 is located at the proximal end 222 of the arm 220, as can be seen in FIG. 10. During operation, stop member 330 engages the flat surface 211, thus preventing the arm 220 from pivoting to a position where the handle 230 touches the door surface. In one embodiment, this stop member 330 is a rubber plug, which would decrease the bounce when retracted. Although other materials for the stop member 330 would be within the scope of the invention.

Figure 11B:
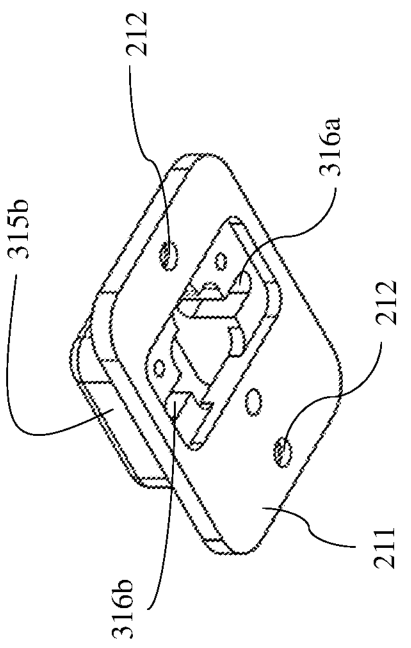
FIG. 11B shows a bottom perspective view of the base according to at least one embodiment of the present disclosure.
Figure 11A:
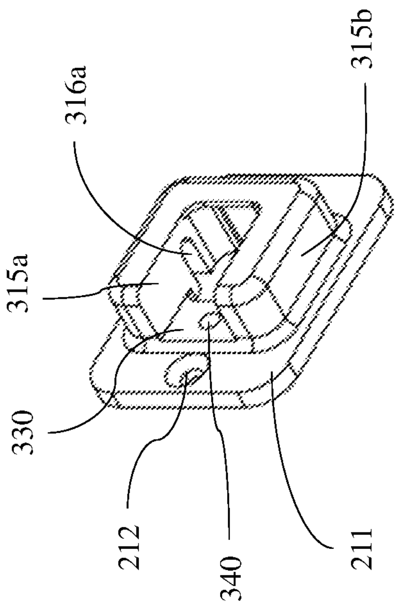
FIG. 11A shows a top perspective view of the base according to at least one embodiment of the present disclosure.
Figure 12:
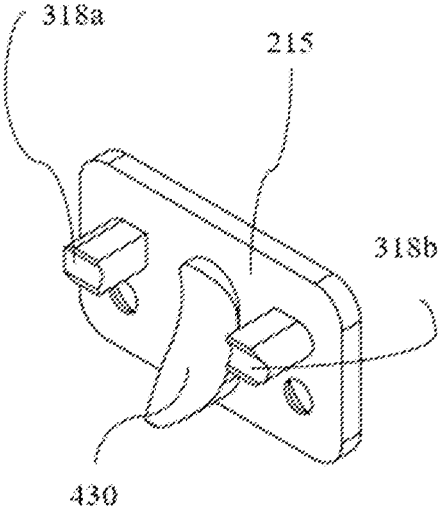
FIG. 12 shows a perspective view of the bottom portion according to at least one embodiment of the present disclosure.

In another embodiment, as seen in FIG. 11A, stop member 330 is located on the upper side of the flat surface 211, for engaging the proximal end of the arm 220.

According to at least some embodiments, the height of stop member 330, as measured from flat surface 211, is selected such that when the arm is resting on stop member 330, the arm 220 is substantially parallel with flat surface 211. However, other heights are within the scope of the present disclosure, and the present disclosure is not so limited. For example, the height of stop member 330 may be selected such that the arm, when resting on stop member 330, has a distal end 221 which is closer to the door surface (or flat surface 211) than its proximal end 222. Alternatively, the height of stop member 330 may be selected such that the arm, when resting on stop member 330, has a distal end 221 which is farther away from the door surface (or flat portion 211) than its proximal end 222.

In another embodiment, as seen in FIG. 11A, an adjusting screw 340 is positioned to increase the gap between the handle 230 and the door 110. As seen in FIG. 11A, this could be used in conjunction with the stop member 330, but could also be used independently.

According to these embodiments, when installed on a door surface, a device comprising a stop member 330 allows the handle to be grasped easily without needing to separate the handle from the door surface.

Alternatively, a spacer may be installed on the door at a position aligned with the arm of the device, such that when the arm is moved in a position towards the door, the spacer catches the arm and prevents it from touching the door. This allows space to remain between the handle and the door and allows for easy operation of the device for people lacking the ability to grasp objects with their hands. The spacer may be made of rubber, or any other suitable material.

Accordingly, the above describes a device for assisting a person in closing a door. While this device is particularly suited to people suffering from disabilities requiring a wheelchair, other people may benefit from use of the device. For example, elderly people (whether in their home or in a retirement home) will benefit from use of a device according to the present disclosure. Furthermore, people working on construction sites will benefit from the use of such a device. More generally, a device according to the present disclosure will be beneficial to anyone having to occasionally reach for a door knob at the far end of a door while they have their hands full, or suffer from limited mobility. A device according to the present disclosure may be attached to any door, including, but not limited to, bathroom doors, office doors, entrances, access doors, and the like.

It should be noted that although the biasing mechanism 400 detailed above has been described in use for assisting with the closing of a door, the present invention also includes the use of the biasing mechanism 400 in other situations where a biased position is desired. For example, the biasing mechanism 400 could be located on the inside of a cabinet door, with the flat surface 211 of the base 210 secured to the inside of the cabinet frame, with an element being secured to, and extending longitudinally from, the base 210. In this embodiment the longitudinal element would function the same as the arm 220 described above. The longitudinal element could then be fastened to the inside of the cabinet door, and the biased position could be when the cabinet door is in a closed position.

Similar to the cabinet door example provided above, the biasing mechanism 400 could be used on the inside of a regular door as well. The flat surface 211 of the base 210 secured to the inside of the door frame, with an element being secured to, and extending longitudinally from, the base 210. The longitudinal element could then be fastened to the inside of the door.

Another example where the biasing mechanism 400 could be used is on the interior of a container having an upwards-opening lid, such as a freezer or a cooler. Similar to the cabinet door example provided above, the biasing mechanism could be secured to the inside of the container/lid assembly, with the element extending longitudinally along the inside of, and fastened to, the lid. With the desired biasing position being with the lid closed, the biasing mechanism could function similarly, without departing from the scope of the invention.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

The invention claimed is:

1. A device comprising:

a base having a flat surface and a bottom portion;

an arm extending from the base, the arm comprises a proximal end and a distal end, with the arm being secured to the base via a pivoting axis allowing the arm to pivot with respect to the base between a first position where the arm is substantially parallel to the base, and a second position where the arm is substantially perpendicular to the base;

a handle at the distal end of the arm;

the arm including a cavity therein at the proximal end of the arm; and biasing means comprising:

a spring within the cavity of the arm;

a concave ramp extending upwardly from the bottom portion, the concave ramp having a first end and a second end; and a rigid member positioned against the spring and extending out from the cavity to engage with the concave ramp;

wherein the radial distance from the pivoting axis to the first end of the concave ramp is greater than the radial distance from the pivoting axis to any other point of the concave ramp, thus allowing the rigid member to extend the furthest out of the arm cavity when the arm is substantially parallel to the flat surface, thereby biasing the arm in a direction towards the first position.

2. The device of claim 1, wherein the pivoting axis is defined by two pins extending outwardly from opposing sides of the arm.

3. The device of claim 2, wherein the bottom surface includes two pin supports which extend upwardly from the bottom surface to engage the two pins.

4. The device of claim 3, wherein the base comprises two shoulders extending upwardly from the flat surface, and wherein the proximal end of the arm is positioned in a cavity defined by the two shoulders.

5. The device of claim 4, wherein each of the two shoulders includes a channel for housing one of the pin supports and one of the pins.

6. The device of claim 1, further comprising a stop member configured to restrict the pivoting of the arm towards the base such that when the arm rests against the stop member the arm is in the first position.

7. The device of claim 6, wherein the stop member is located on the arm.

8. A door comprising:

a door body;

a device according to claim 1 secured to the door body.

9. A biasing device, comprising:

a base having a flat surface and a bottom portion;

an element extending in a longitudinal direction from the base, the element comprising a proximal end and a distal end, with the element being secured to the base via a pivoting axis allowing the element to pivot with respect to the base between a biased position and an unbiased position;

the element including a cavity therein at the proximal end of the element; and biasing means comprising:

a spring within the cavity of the element;

a concave ramp extending upwardly from the bottom portion, the concave ramp having a lower first end and an upper second end; and a rigid member positioned against the spring and extending out from the cavity to engage with the concave ramp;

wherein the radial distance from the pivoting axis to the concave ramp is greatest when the element is in the biased position, thus allowing the rigid member to extend the furthest out of the cavity when the element is in the biased position, thereby biasing the arm in a direction towards the biased position.

10. The device of claim 9, wherein the element is in the biased position when the element is substantially parallel to the flat surface of the base.

11. The device of claim 9, wherein the element is in the biased position when the element is substantially perpendicular to the flat surface of the base.

12. The device of claim 9, wherein the pivoting axis is defined by two pins extending outwardly from opposing sides of the arm.

13. The device of claim 12, wherein the bottom surface includes two pin supports which extend upwardly from the bottom surface to engage the two pins.

14. The device of claim 13, wherein the base comprises two shoulders extending upwardly from the flat surface, and wherein the proximal end of the arm is positioned in a cavity defined by the two shoulders.

15. The device of claim 14, wherein each of the shoulders includes a channel for housing one of the pin supports and one of the pins.

16. The device of claim 9, further comprising a stop member configured to restrict the pivoting of the arm towards the base such that when the arm rests against the stop member the arm is in the biased position.

17. The device of claim 16, wherein the stop member is located on the arm.

* * * * *